US011207672B2

(12) United States Patent
Lee et al.

(10) Patent No.: US 11,207,672 B2
(45) Date of Patent: Dec. 28, 2021

(54) ALKALINE ANION EXCHANGE MEMBRANES DERIVED FROM DIPHENYLETHYLENE AND CO-MONOMER FEEDSTOCK

(71) Applicant: RENSSELAER POLYTECHNIC INSTITUTE, Troy, NY (US)

(72) Inventors: Sangwoo Lee, Cohoes, NY (US); Chulsung Bae, Cohoes, NY (US); Musashi J. Briem, Troy, NY (US); Sungmin Park, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/287,639

(22) PCT Filed: Oct. 22, 2019

(86) PCT No.: PCT/US2019/057356
§ 371 (c)(1),
(2) Date: Apr. 22, 2021

(87) PCT Pub. No.: WO2020/086530
PCT Pub. Date: Apr. 30, 2020

(65) Prior Publication Data
US 2021/0308663 A1 Oct. 7, 2021

Related U.S. Application Data

(60) Provisional application No. 62/916,288, filed on Oct. 17, 2019, provisional application No. 62/748,671, filed on Oct. 22, 2018.

(51) Int. Cl.
B01J 41/07 (2017.01)
C08F 212/32 (2006.01)
C08J 5/22 (2006.01)
B01J 47/12 (2017.01)
B01D 61/44 (2006.01)
C02F 1/469 (2006.01)
B01D 71/06 (2006.01)
B01J 41/14 (2006.01)

(52) U.S. Cl.
CPC .............. B01J 41/07 (2017.01); B01D 61/44 (2013.01); B01D 71/06 (2013.01); B01J 41/14 (2013.01); B01J 47/12 (2013.01); C02F 1/469 (2013.01); C08F 212/32 (2013.01); C08J 5/2287 (2013.01); C08F 2810/00 (2013.01)

(58) Field of Classification Search
CPC .. B01J 41/07; B01J 41/14; B01J 47/12; C08F 212/32; C08J 5/22; B01D 61/44; B01D 71/06; C02F 1/469

USPC ........................................................ 521/27
See application file for complete search history.

(56) References Cited

U.S. PATENT DOCUMENTS 4,126,589 A * 11/1978 Hamada .................. C08J 5/225
521/31
9,580,824 B2 * 2/2017 Masel ................. H01M 8/1044
2002/0010261 A1 * 1/2002 Callahan ............ B01D 67/0006
524/832
2015/0307659 A1 * 10/2015 Hong .................... H01M 8/188
429/492

OTHER PUBLICATIONS

Fan et al. "Living Anionic Surface-Initiated Polymerization (LASIP) of Styrene from Clay Nanoparticles Using Surface Bound 1,1-Diphenylethylene (DPE) Initiators", Langmuir 2002, 18, 4511-4518. (Year: 2002).*
International Search Report and the Written Opinion of the International Searching Authority, International Application No. PCT/US2019/057356, dated Feb. 5, 2020.
Fan, X., et al., "Living Anionic Surface-Initiated Polymerization (LASIP) of Styrene from Clay Nanoparticles Using Surface Bound 1,1-Diphenylethylene (DPE) Initiators," Langmuir, vol. 18, pp. 4511-4518, May 4, 2002.
Yuki, H., et al., "Anionic Copolymerization of Butadiene and 1,1-Diphenylethylene," Bulletin of the Chemical Society of Japan, 1970 43:1, pp. 148-151.

* cited by examiner

Primary Examiner — Michael M. Bernshteyn
(74) Attorney, Agent, or Firm — Murtha Cullina LLP; Anthony P. Gangemi

(57) ABSTRACT

The anion exchange membranes exhibit enhanced chemical stability and ion conductivity when compared with traditional styrene-based alkaline anion exchange membranes. A copolymer backbone is polymerized from a reaction medium that includes a diphenylalkylene and an alkadiene. The copolymer includes a plurality of pendant phenyl groups. The diphenyl groups on the polymer backbone are functionalized with one or more haloalkylated precursor substrates. The terminal halide from the precursor substrate can then be substituted with a desired ionic group. The diphenylethylene-based alkaline anion exchange membranes lack the α-hydrogens sharing tertiary carbons with phenyl groups from polystyrene or styrene-based precursor polymers, resulting in higher chemical stability. The ionic groups are also apart from each other by about 3 to 6 carbons in the polymer backbone, enhancing ion conductivity. These membrane are advantageous for use in fuel cells, electrolyzers employing hydrogen, ion separations, etc.

3 Claims, 19 Drawing Sheets

ALKALINE ANION EXCHANGE MEMBRANES DERIVED FROM DIPHENYLETHYLENE AND CO-MONOMER FEEDSTOCK

CROSS REFERENCE TO RELATED APPLICATIONS

This application is a national stage filing of International Patent Application No. PCT/US2019/057356, filed Oct. 22, 2019, which claims the benefit of U.S. Provisional Patent Application Nos. 62/916,288, filed on Oct. 17, 2019, and 62/748,671, filed on Oct. 22, 2018, which are incorporated herein by reference in their entireties.

STATEMENT REGARDING FEDERALLY SPONSORED RESEARCH OR DEVELOPMENT

This invention was made with government support under 1545857 awarded by National Science Foundation and DE-AC52-06NA25396 awarded by the United States Department of Energy. The government has certain rights in the invention.

BACKGROUND

Ion exchange membranes such as anion exchange membranes (AEMs) allow transportation of anions (e.g., OH⁻, Cl⁻, Br⁻, etc.) across electrodes (cathode to anode and vice versa) in electrochemical reactions. AEMs are one of the most critical components of fuel cells where hydrogen and oxygen are used to generate electricity and water by-product. They are also used in water electrolysis where water splits into hydrogen and oxygen with the help of electricity, which is the cleanest and the most desirable process of hydrogen production. Other areas of AEMs include electrochemical hydrogen compressors, batteries, sensors, and actuators (plastic membranes swing reversibly as a result of migration of ions). The performance and chemical stability of alkaline anion exchange membranes for the electrochemical applications such as fuel cells and electrolyzers are significantly dependent on the chain architectures of membrane polymers, especially the spacing of main backbone chain between side chains containing ionic groups and the length of the side chains.

Currently, as shown in FIG. 1, polystyrene or styrene-copolymers are functionalized using various synthetic procedures, for example, chloromethylation, radical bromination, Friedel-Crafts acylation, and sulfonation, to introduce ionic groups at the phenyl groups of polystyrene or styrene-copolymers. These functionalized polymers are directly or further post-modified, e.g., with quaternary ammonium groups, to fabricate alkaline anion exchange membranes.

SUMMARY

Some embodiments of the present disclosure are directed to an ion exchange membrane material a polymer according to Formula I:

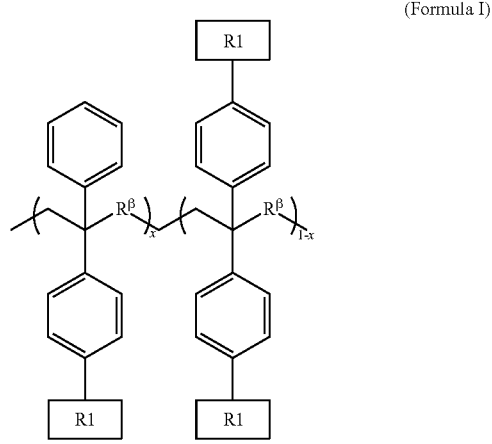

(Formula I)

In some embodiments, each $R^\beta$ includes an alkadiene, a hydrogenated alkadiene, or combinations thereof. In some embodiments, each $R^\beta$ includes a hydrocarbyl backbone chain having about 3 to about 6 carbons. In some embodiments, each $R^\beta$ includes butadiene, isoprene, hydrogenated butadiene, hydrogenated isoprene, or combinations thereof. In some embodiments, each R1 includes an alkylated substrate including a hydrocarbyl group and at least one ionic group. In some embodiments, the ionic groups include one or more ammonium groups, one or more multication hydrocarbyl chains, or combinations thereof.

In some embodiments, the polymer includes the structure according to Formula II:

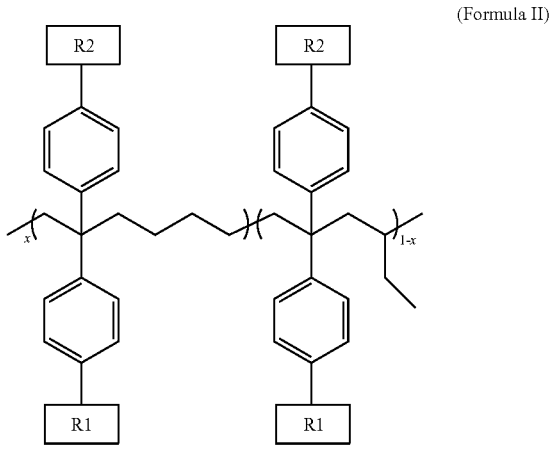

(Formula II)

In some embodiments, each R1 includes an alkylated substrate including a hydrocarbyl group and at least one ionic group. In some embodiments, each R2 is R1, H, or combinations thereof. In some embodiments, x is between about 0.8 to about 0.9. In some embodiments, R1 groups are substantially evenly distributed long the polymer. In some embodiments, each R1 includes the structure according to Formula III:

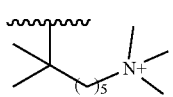

(Formula III)

Some embodiments of the present disclosure are directed to a method of making an ion exchange membrane material including providing a reaction medium including a diphenylalkylene and an alkadiene, copolymerizing a polymer from the diphenylalkylene and alkadiene, the polymer including a backbone having a plurality of pendant phenyl groups, hydrogenating one or more unsaturated carbons of the polymer backbone, functionalizing the polymer backbone with one or more haloalkylated precursor substrates, and substituting a halide from the one or more haloalkylated precursor substrates with an ionic group.

In some embodiments, the diphenylalkylene is diphenylethylene. In some embodiments, the alkadiene includes butadiene, isoprene, or combinations thereof. In some embodiments, the plurality of pendant phenyl groups are diphenyl groups. In some embodiments, the one or more haloalkylated precursor substrates include a tertiary alcohol and a halogenated hydrocarbon. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, functionalizing the polymer backbone with one or more functional groups includes reacting the one or more haloalkylated precursor substrates with the phenyl groups. In some embodiments, substituting a halide from the one or more haloalkylated precursor substrates with an ionic group includes reacting the one or more haloalkylated precursor substrates with trimethylamine.

Some embodiments of the present disclosure are directed to a method of making an ion exchange membrane, including providing a reaction medium including a diphenylethylene and alkadiene monomers, copolymerizing a polymer from the diphenylethylene and alkadiene monomers, grafting one or more haloalkylated precursor substrates to the polymer, substituting a halide from the one or more haloalkylated precursor substrates with an amine functional group to form an ion exchange membrane material, and casting the ion exchange membrane material as an ion exchange membrane.

In some embodiments, the alkadiene monomers include butadiene, isoprene, or combinations thereof. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, the amine functional group includes at least one alkyl group, aryl group, or combinations thereof.

DETAILED DESCRIPTION

Figure 1:
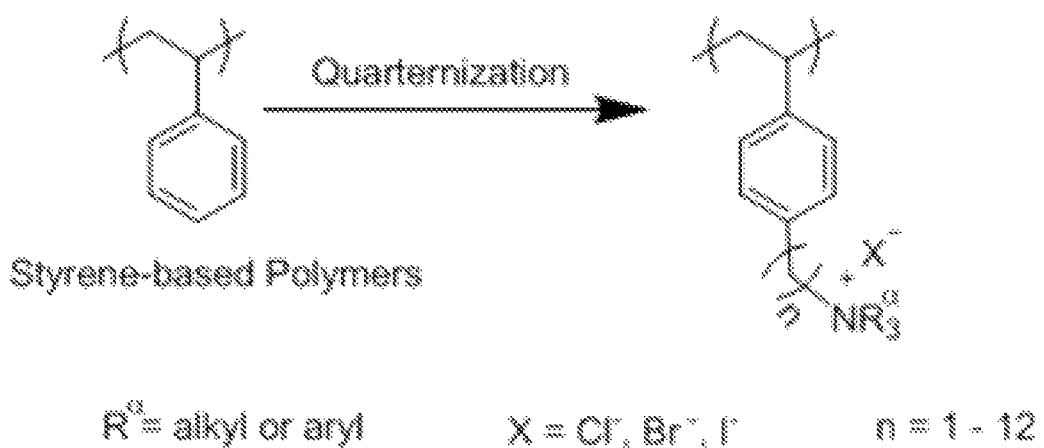
FIG. 1 is a representation of a prior art reaction pathway for functionalizing polystyrene or styrene-copolymers.
Figure 2A:
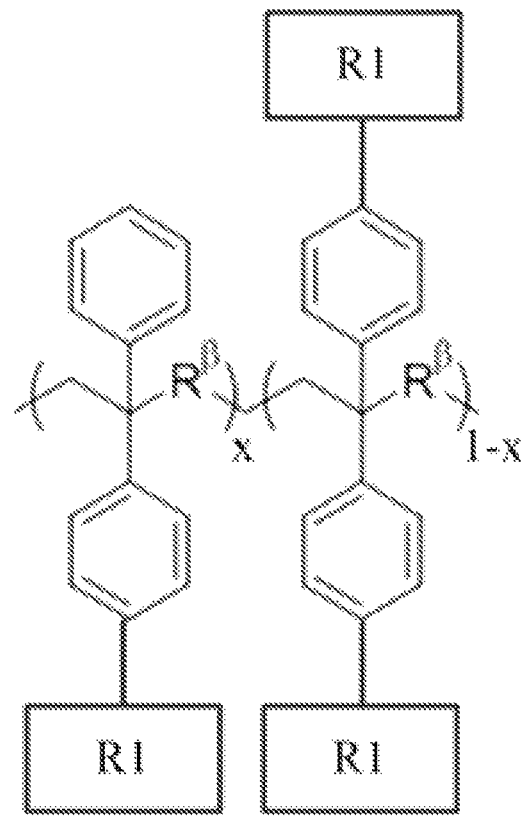
FIGS. 2A-2C are schematic representations of an ion exchange membrane material according to some embodiments of the present disclosure.
Figure 2B:
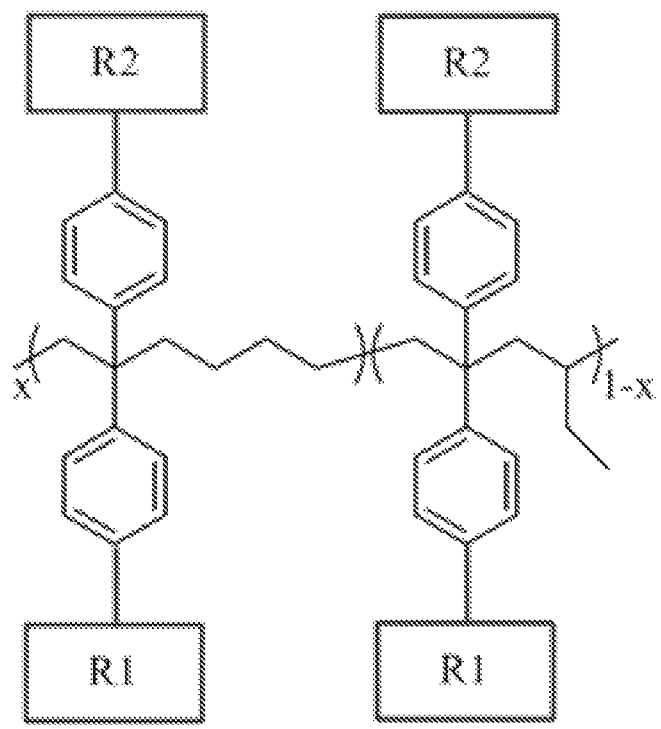
Figure 2C:
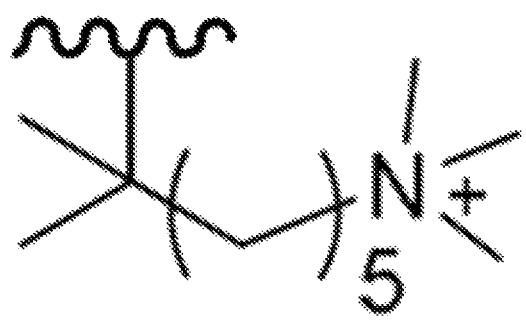

Referring now to FIGS. 2A-2C, aspects of the disclosed subject matter include an ion exchange membrane material composed of one or more polymers. In some embodiments, the one or more polymers are copolymers or block copolymers. As will be discussed in greater detail below, in some embodiments, the copolymers are produced, in part, via a copolymerization reaction between a diphenylalkylene reaction component and an alkadiene reaction component. In some embodiments, the diphenylalkylene reaction component includes diphenylalkylene monomers, diphenylalkylene oligomers, diphenylalkylene polymers, or combinations thereof. In some embodiments, the diphenylalkylene reaction component is diphenylethylene. In some embodiments, the diphenylalkylene reaction component includes one or more functional groups. In some embodiments, the one or more functional groups include a hydrocarbyl group and at least one ionic group. As used herein, the term "hydrocarbyl" is used to refer to saturated and unsaturated hydrocarbon compounds. In some embodiments, the diphenylalkylene reaction component is functionalized diphenylethylene. In some embodiments, the alkadiene reaction component includes alkadiene monomers, alkadiene oligomers, alkadiene polymers, or combinations thereof. In some embodiments, the alkadiene reaction component is butadiene, isoprene, or combinations thereof. In some embodiments, the alkadiene reaction component includes functionalized butadiene, isoprene, or combinations thereof.

Referring specifically to FIG. 2A, in some embodiments, the one or more polymers include the following formula:

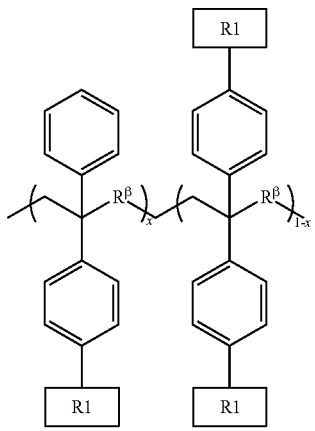

(Formula I)

In some embodiments, each $R^\beta$ includes a hydrocarbyl backbone chain. In some embodiments, the hydrocarbyl backbone chain has about 3 to about 6 carbons. In some embodiments, each $R^\beta$ is, individually, an alkadiene, a hydrogenated alkadiene, or combinations thereof. In some embodiments, each $R^\beta$ includes, individually, a butadiene, an isoprene, a hydrogenated butadiene, a hydrogenated isoprene, or combinations thereof. In some embodiments, each R1 includes an alkylated substrate including a hydrocarbyl group and at least one ionic group. In some embodiments, the ionic groups include one or more ammonium groups, one or more multication hydrocarbyl chains, or combinations thereof.

Referring specifically to FIG. 2B, in some embodiments, the one or more polymers include the following formula:

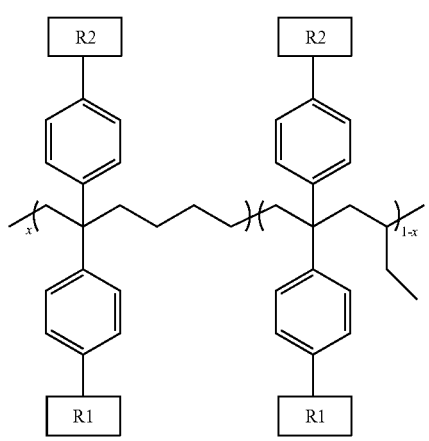

(Formula II)

In some embodiments, each R1 includes an alkylated substrate including a hydrocarbyl group and at least one of the above-identified ionic groups. In some embodiments, the R1 groups are substantially evenly distributed long the polymer. In some embodiments, each R2 is, individually, an R1 group, H, or combinations thereof. In some embodiments, x is between about 0.75 and about 0.95. In some embodiments, x is between about 0.8 to about 0.9. Referring specifically to FIG. 2C, in some embodiments, R1 includes the structure according to Formula III:

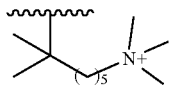

(Formula III)

Figure 3:
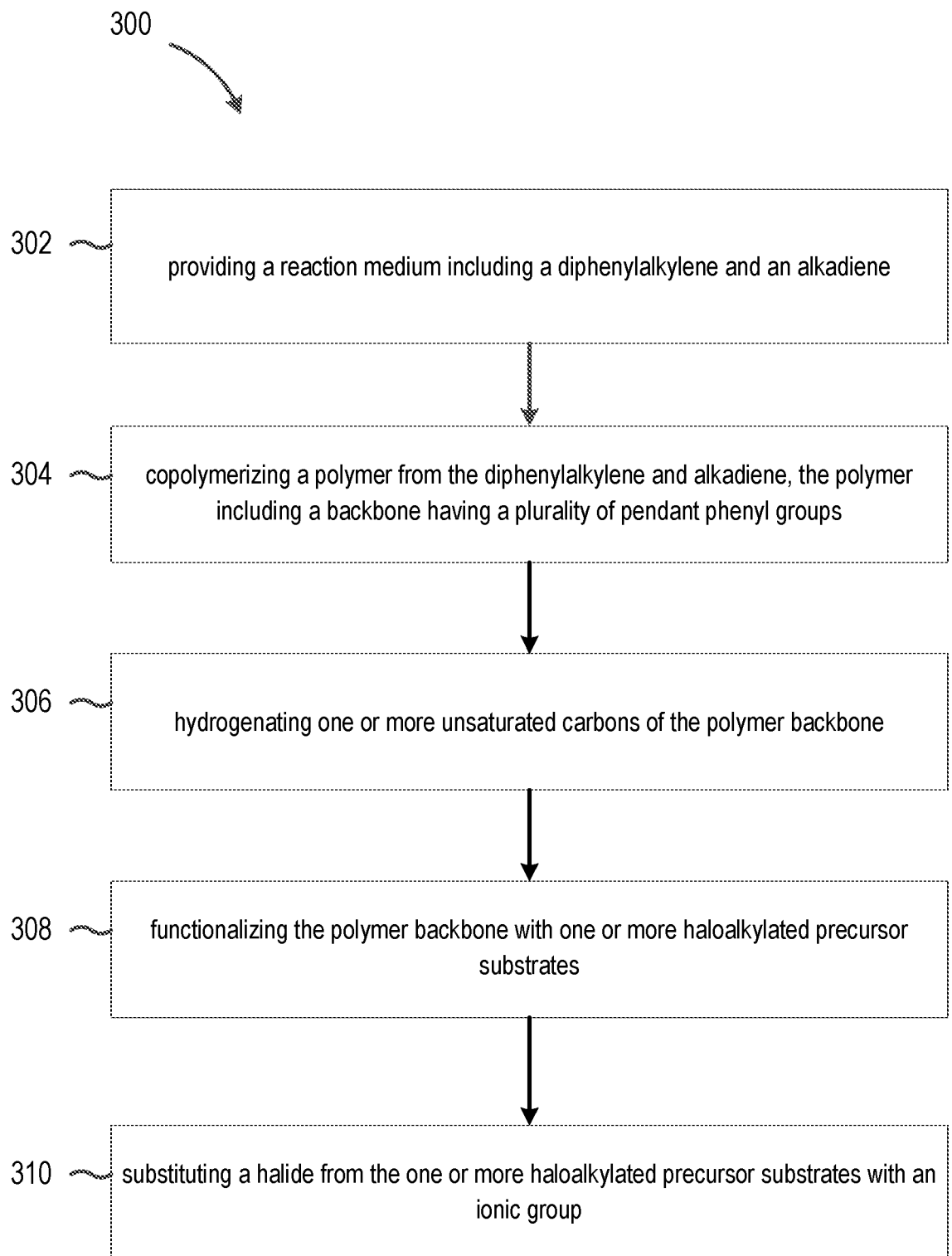
FIG. 3 is a chart of a method of making an ion exchange membrane material according to some embodiments of the present disclosure.

Referring now to FIG. 3 and as discussed above, some embodiments of the present disclosure are directed to a method 300 of making an ion exchange membrane material. In some embodiments, at 302, a reaction medium is provided that includes a diphenylalkylene and an alkadiene. As discussed above, in some embodiments, the diphenylalkylene is diphenylethylene. Also as discussed above, in some embodiments, the alkadiene includes butadiene, isoprene, or combinations thereof. In some embodiments, at 304 a polymer is copolymerized from the diphenylalkylene and alkadiene. In some embodiments, the polymer includes a backbone having a plurality of pendant phenyl groups. In some embodiments, the plurality of pendant phenyl groups are diphenyl groups. In some embodiments, at 306, one or more unsaturated carbons of the polymer backbone are hydrogenated. In some embodiments, at 308, the polymer backbone is functionalized with one or more haloalkylated precursor substrates. In some embodiments, the one or more haloalkylated precursor substrates include a tertiary alcohol and a halogenated hydrocarbon. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, the polymer backbone are functionalized 308 by reacting the one or more haloalkylated precursor substrates with the phenyl groups on the polymer backbone. In some embodiments, at 310, a halide from the one or more haloalkylated precursor substrates is substituted with an ionic group. In some embodiments, the halide is substituted 310 by reacting the haloalkylated precursor substrates with trimethylamine.

Figure 4:
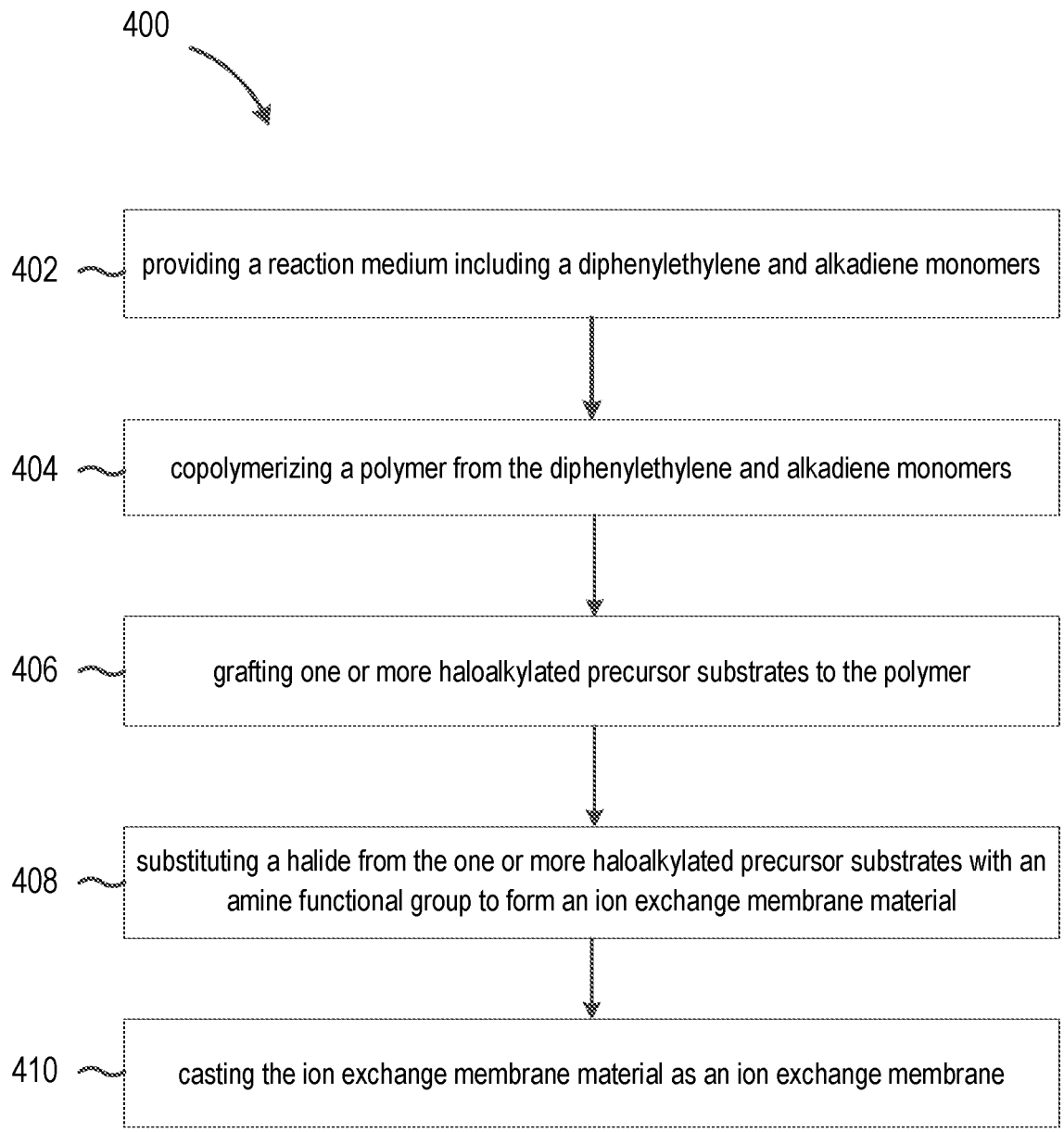
FIG. 4 is a chart of a method of making an ion exchange membrane material according to some embodiments of the present disclosure.

Referring now to FIG. 4, some embodiments of the present disclosure are directed to a method 400 of making an ion exchange membrane. In some embodiments, at 402, a reaction medium is provided including a diphenylethylene and alkadiene monomers. In some embodiments, at 404, a polymer is copolymerized from the diphenylethylene and alkadiene monomers. In some embodiments, at 406, one or more haloalkylated precursor substrates is grafted to the polymer. In some embodiments, at 408, a halide from the one or more haloalkylated precursor substrates is substituted with an amine functional group to form an ion exchange membrane material. In some embodiments, the amine functional group includes at least one alkyl group, aryl group, or combinations thereof. In some embodiments, at 410, the ion exchange membrane material is cast as an ion exchange membrane.

Figure 5:
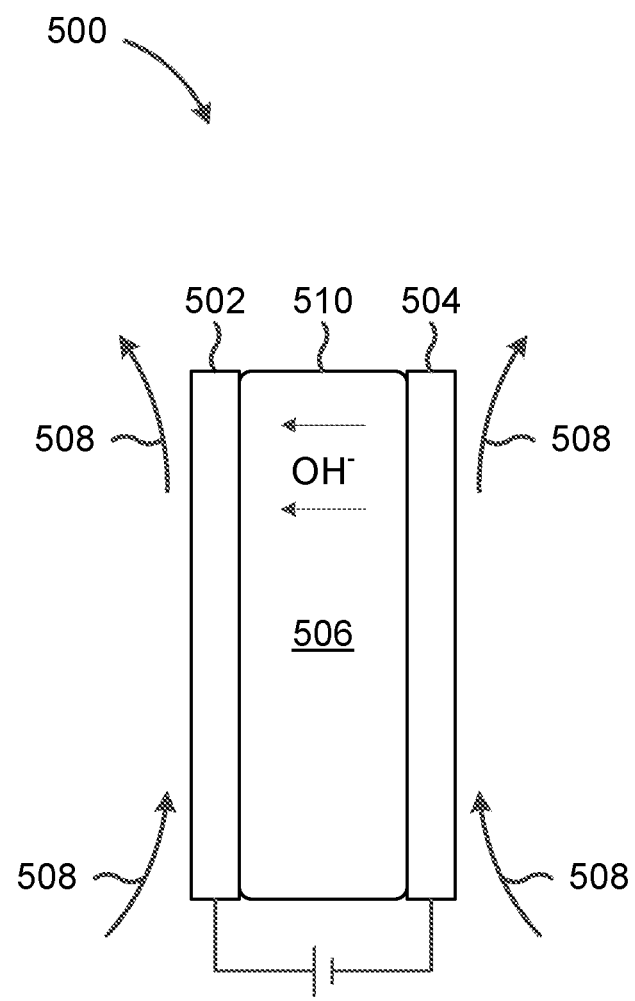
FIG. 5 is a schematic drawing of an electrochemical energy conversion system including an ion exchange membrane according to some embodiments of the present disclosure.

Referring now to FIG. 5, in some embodiments, the ion exchange membrane material is incorporated into an electrochemical energy conversion system 500. In some embodiments, system 500 includes an anode 502, a cathode 504, and an electrolyte 506 disposed between the anode and the cathode. System 500 is suitable for use in numerous applications, such as fuel cells, energy recovery ventilation systems, water electrolysis systems, electrochemical hydrogen compressors, batteries, sensors, actuators, etc. In some embodiments, anode 502 and cathode 504 are composed of any suitable material for use with electrolyte 506 in system 500. In some embodiments, system 500 includes any inlets/outlets 508 to supply reactants to and remove reaction products from anode 502, cathode 504, and electrolyte 506. In some embodiments, system 500 includes a catalyst layer (not pictured).

In some embodiments, electrolyte 506 includes a solid electrolyte. In some embodiments, electrolyte 506 includes ion exchange membrane 510 including the ion exchange membrane material discussed above. In some embodiments, ion exchange membrane 510 is an anion exchange membrane.

EXAMPLE

Figure 6A:
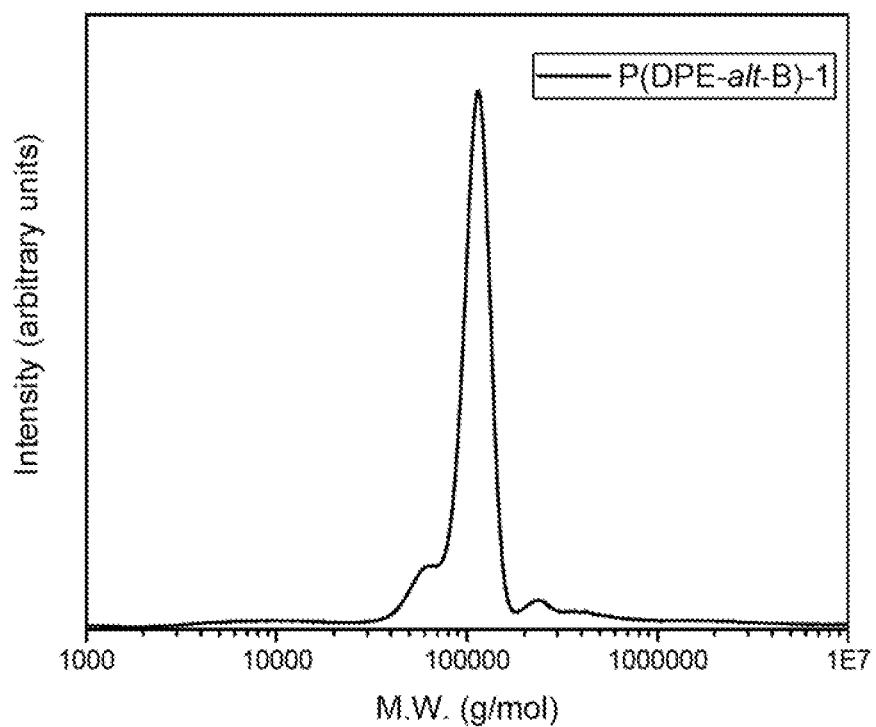
FIGS. 6A-6C are graphs showing molecular weight distributions for three poly(diphenylethylene-alt-butadiene) samples according to some embodiments of the present disclosure.
Figure 6B:
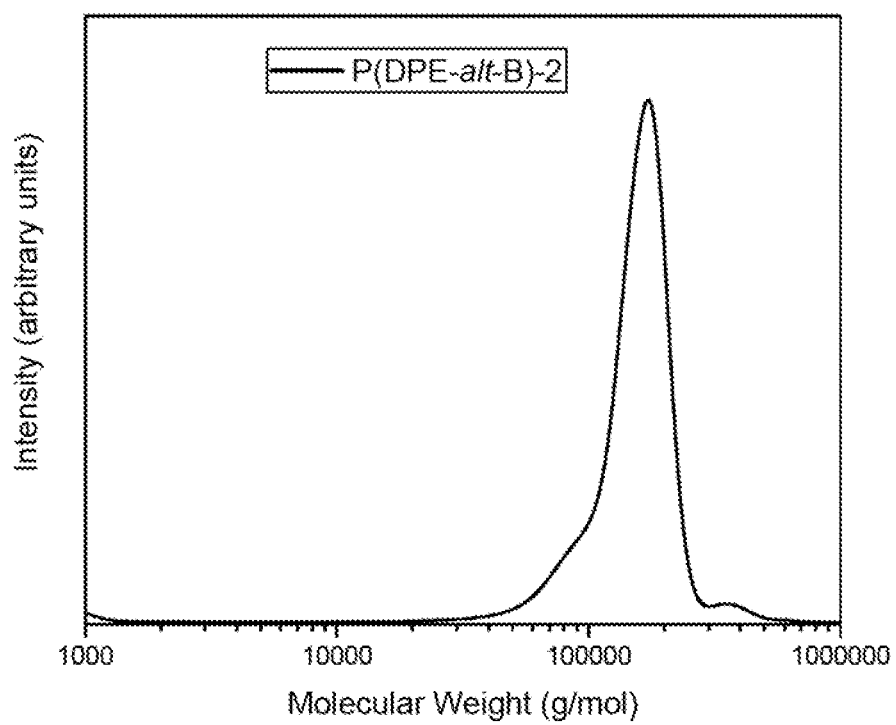
Figure 6C:
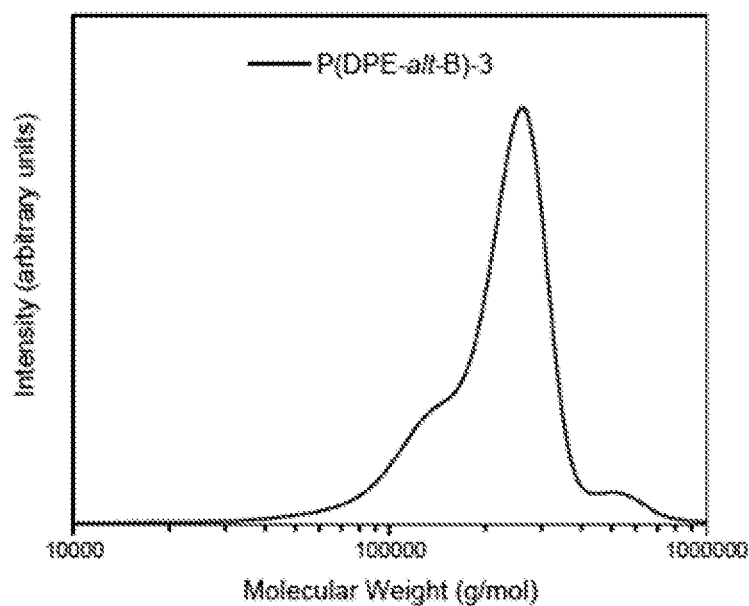
Figure 7A:
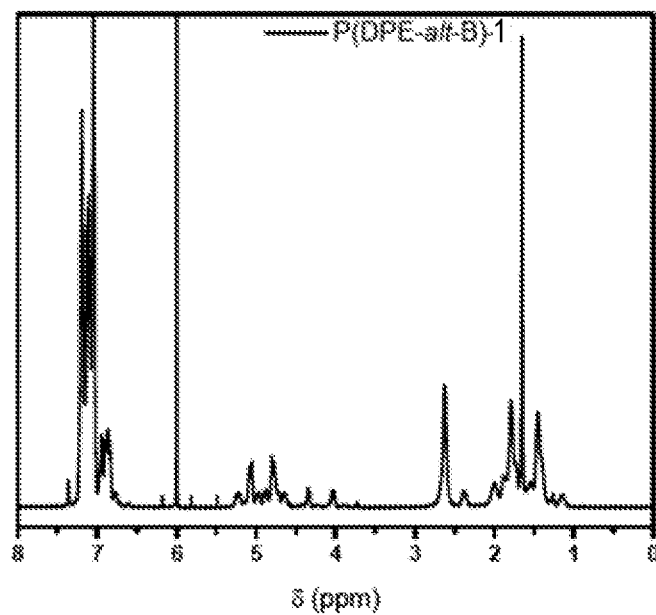
FIGS. 7A-7C are $^1$H NMR spectrums for three poly(diphenylethylene-alt-butadiene) samples according to some embodiments of the present disclosure.
Figure 7B:
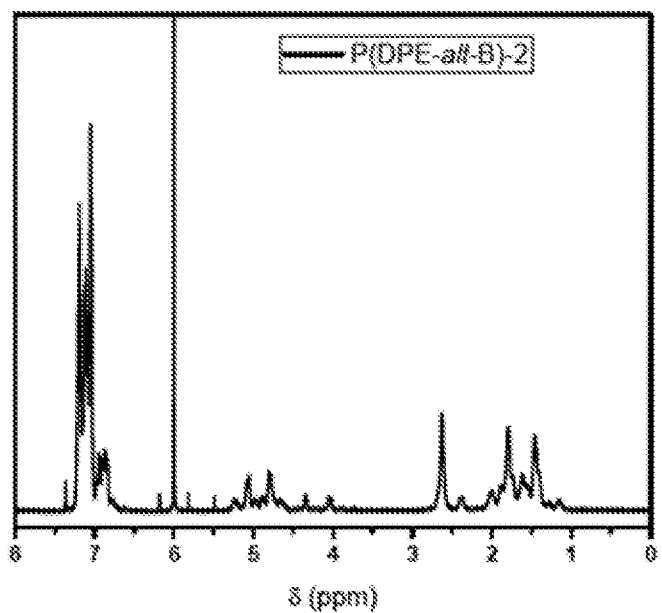
Figure 7C:
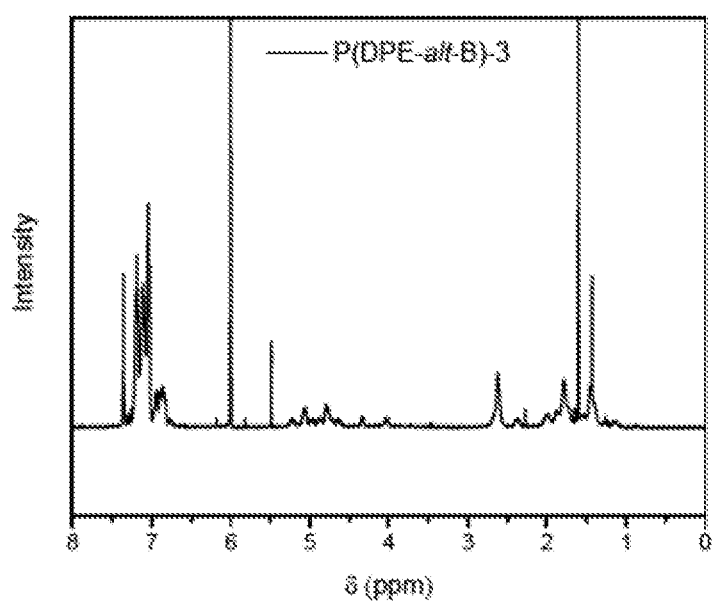

In dry and aprotic tetrahydrofuran (THF) (600 mL) under argon atmosphere, purified 1,1-diphenylethylene (DPE) (23.59 g) was introduced and potassium naphthalenide was added to activate DPE monomers for polymerization at 0° C. Butadiene (7.08 g) was added to the initiated DPE solution. The polymerization could also be conducted using n-butyllithium, sec-butyllithium, tert-butyllithium. The polymerization was conducted for 14 hours and quenched by methanol. Referring now to FIGS. 6A-6C, molecular weight distributions for three samples (P(DPE-alt-B)) were determined. Referring now to FIGS. 7A-7C, $^1$H NMR spectrums for the P(DPE-alt-B) samples were also determined. A small fraction of butadiene dimers were identified between DPE monomers in the chains.

A 0.1 M solution of nickel 2-ethylhexanoate (0.69 g) was made in dry, aprotic cyclohexane (20 mL). 1M Triethylaluminum was added to the solution. 6 mL of 1M triethylaluminum was used for 20 mL of 0.1M nickel 2-ethylhexanoate. The catalyst was stirred for 3 hours prior to use.

Figure 8A:
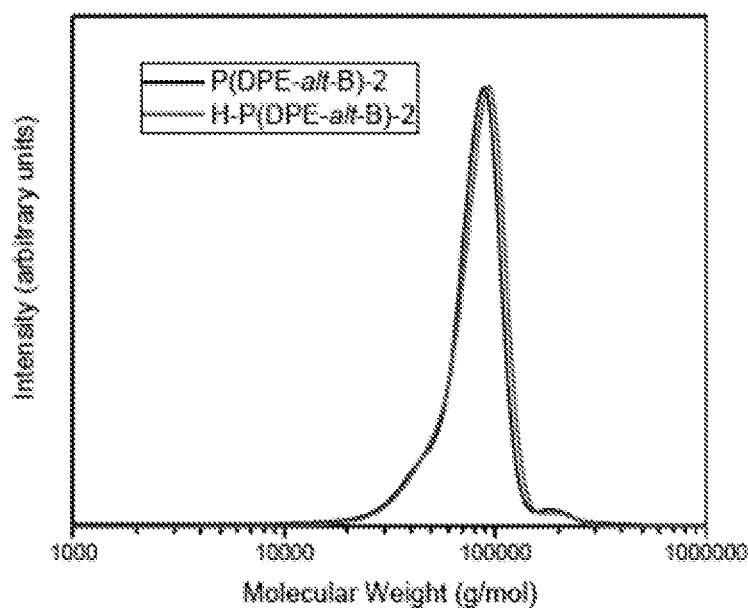
FIGS. 8A-8C are graphs showing molecular weight distributions for three hydrogenated poly(diphenylethylene-alt-butadiene) samples according to some embodiments of the present disclosure.
Figure 8B:
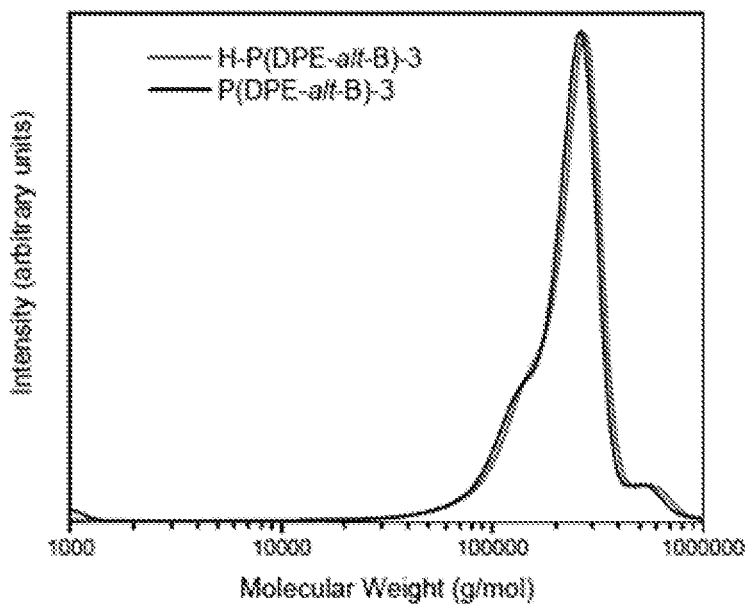
Figure 8C:
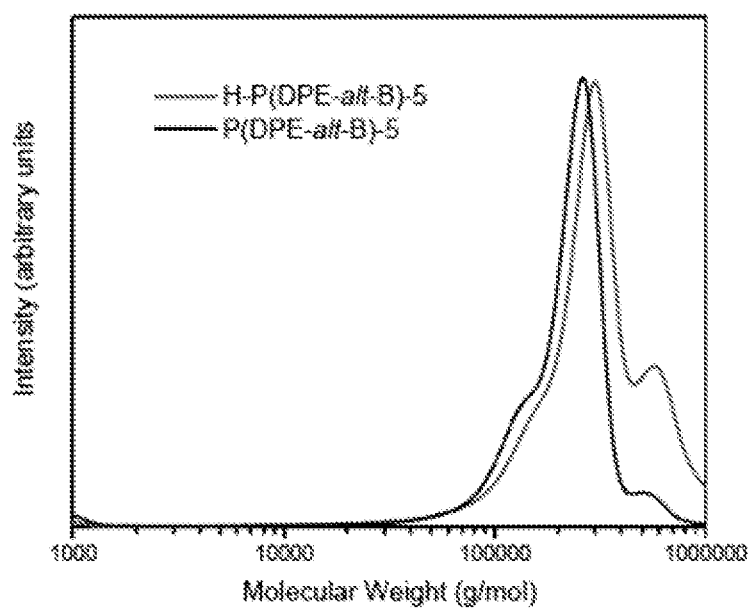
Figure 9A:
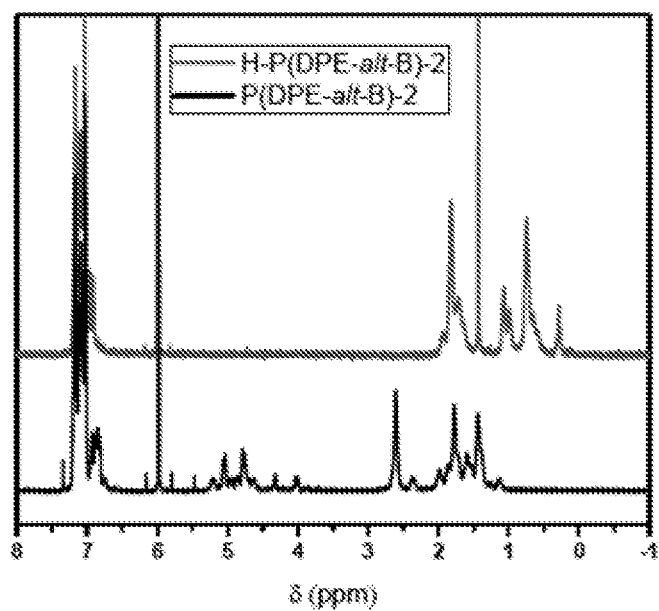
FIGS. 9A-9C are $^1$H NMR spectrums for three hydrogenated poly(diphenylethylene-alt-butadiene) samples according to some embodiments of the present disclosure.
Figure 9B:
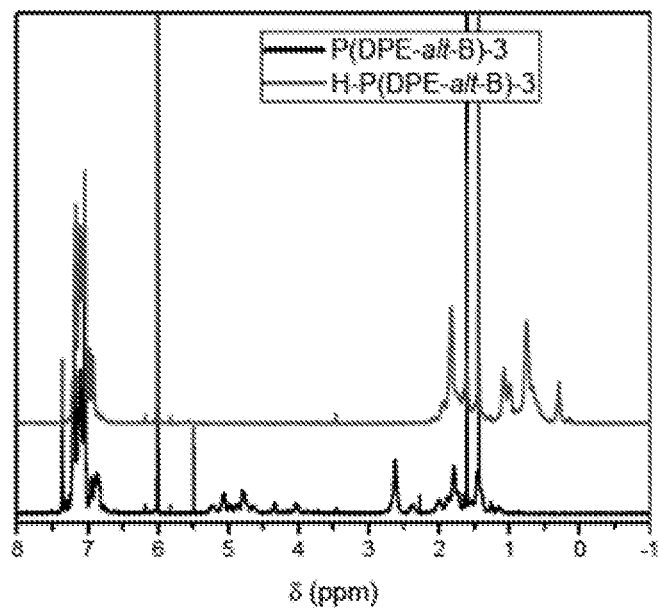
Figure 9C:
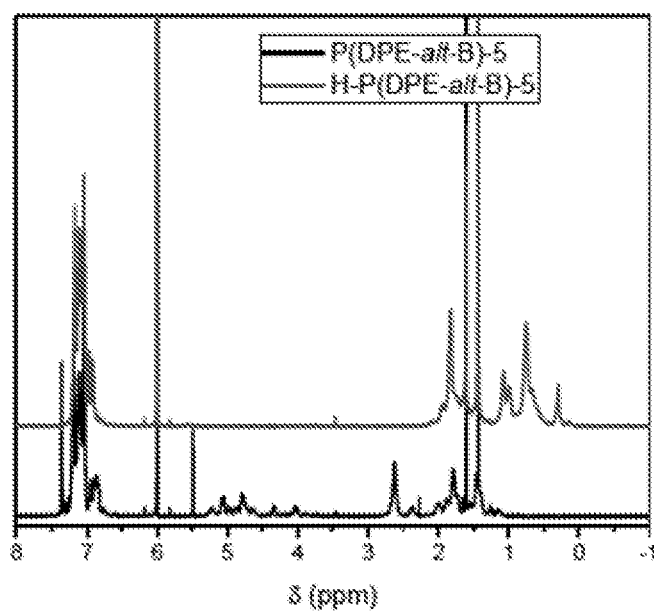

The P(DPE-alt-B) (20 g) was collected and dissolved in dry, aprotic cyclohexane (400 mL). The solution was poured in a Parr hydrogenation reactor and the catalyst was added under argon. The reactor was charged with hydrogen to 600 psi and the temperature was raised to 80° C. The reaction was conducted for 24 hours, then collected at room temperature. To neutralize residual catalyst, aqueous citric acid (1 L, 8 wt %) was added and stirred for 24 hours. The acid was neutralized with continuous stirring with sodium bicarbonate solution (1 L, 8 wt %) for 24 hours. Any residual salt was removed by stirring with deionized water (1 L) for 24 hours. Referring now to FIGS. 8A-8C, molecular weight distributions for three samples (H-P(DPE-alt-B)) were determined. Referring now to FIGS. 9A-9C, $^1$H NMR spectrums for the H-P(DPE-alt-B) samples were also determined.

Figure 10A:
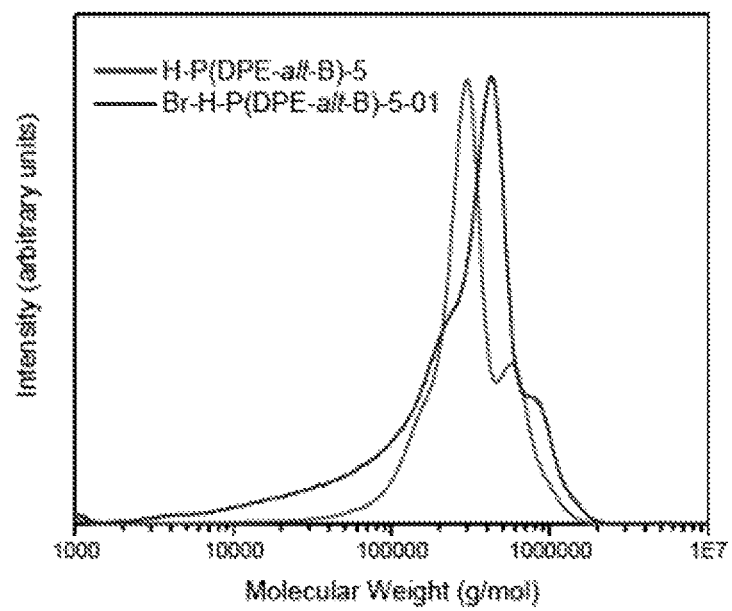
FIGS. 10A-10B are graphs showing molecular weight distributions for two bromofunctionalized selectively hydrogenated poly(diphenylethylene-alt-butadiene) samples according to some embodiments of the present disclosure.
Figure 10B:
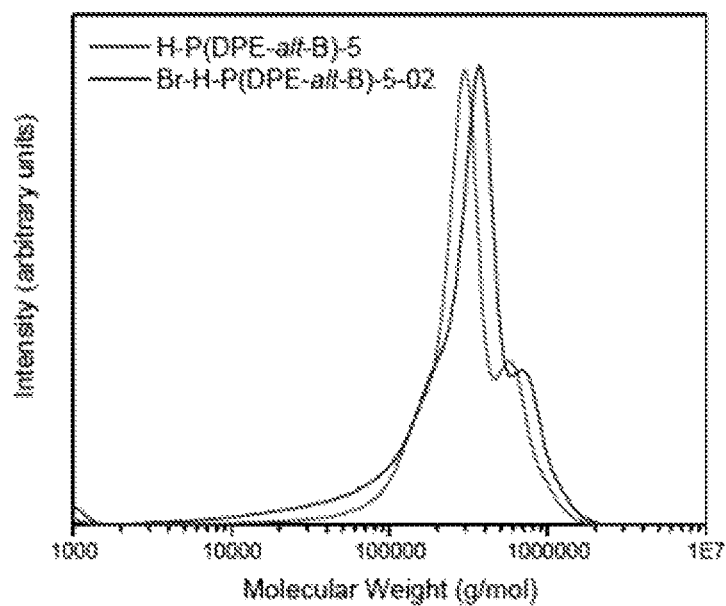
Figure 11A:
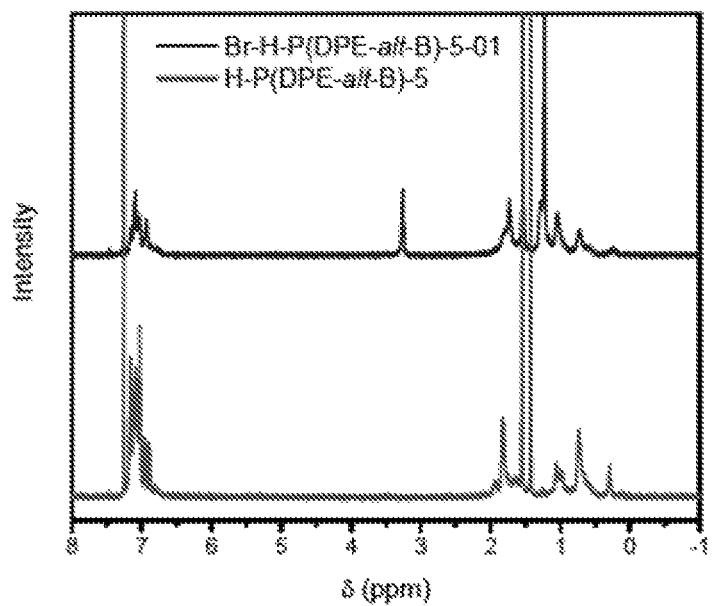
FIGS. 11A-11B are $^1$H NMR spectrums for two bromofunctionalized selectively hydrogenated poly(diphenylethylene-alt-butadiene) samples according to some embodiments of the present disclosure.
Figure 11B:
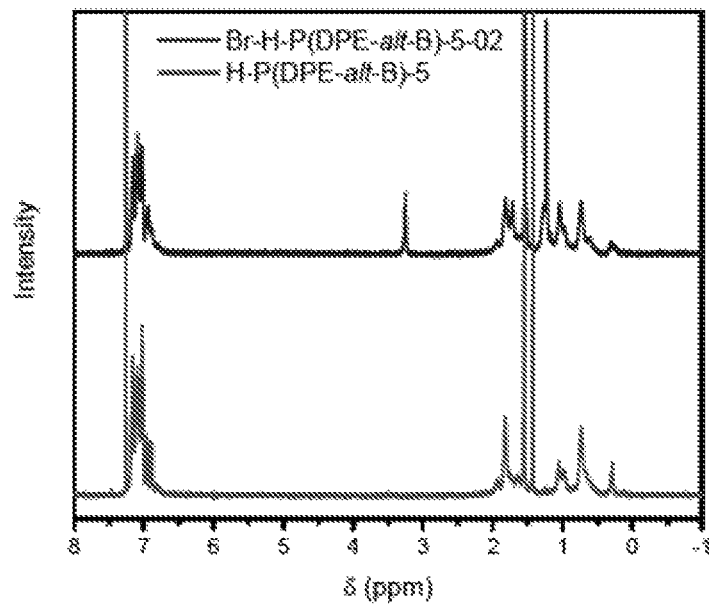

H-P(DPE-alt-B) (0.5 g) was dissolved in anhydrous dichloromethane (DCM) (20 mL) then lowered to 0° C. A brominating agent, 7-bromo-2-methyl-2-heptanol ("tertiary OH", 0.59 g), was added dropwise over five minutes. After the first drop of the tertiary alcohol was added, triflic acid (0.52 mL) was added all at once. The reaction was run for 10 minutes, then precipitated into methanol. Referring now to FIGS. 10A-10B, molecular weight distributions for two samples (Br-H-P(DPE-alt-B)) were determined. Referring now to FIGS. 11A-11B, $^1$H NMR spectrums for the Br-H-P(DPE-alt-B) samples were also determined.

Figure 12:
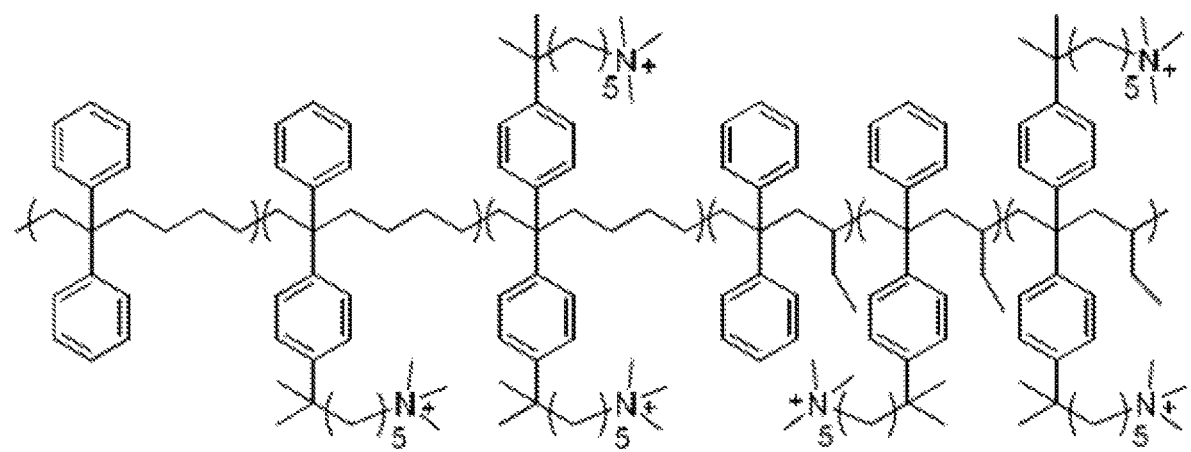
FIG. 12 is a schematic representation of a quaternary ammonium functionalized selectively hydrogenated poly(diphenylethylene-alt-butadiene) according to some embodiments of the present disclosure.
Figure 13A:
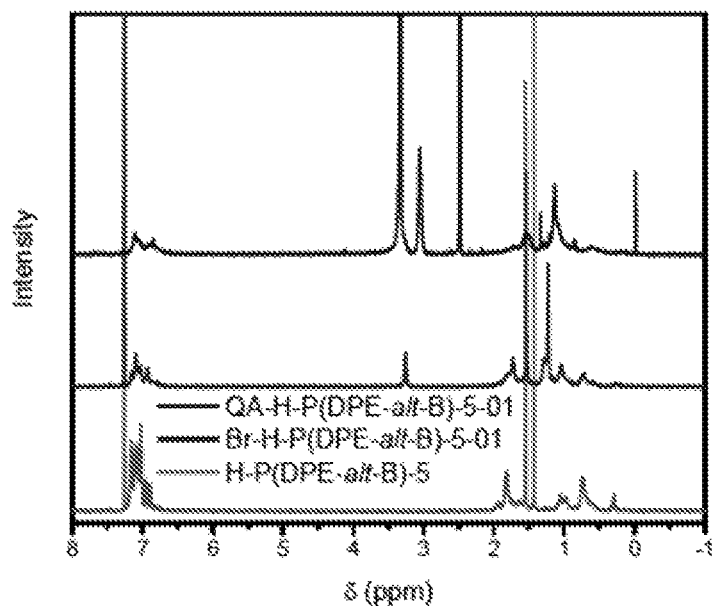
FIGS. 13A-13B are $^1$H NMR spectrums for two quaternary ammonium functionalized selectively hydrogenated poly(diphenylethylene-alt-butadiene) samples according to some embodiments of the present disclosure.
Figure 13B:
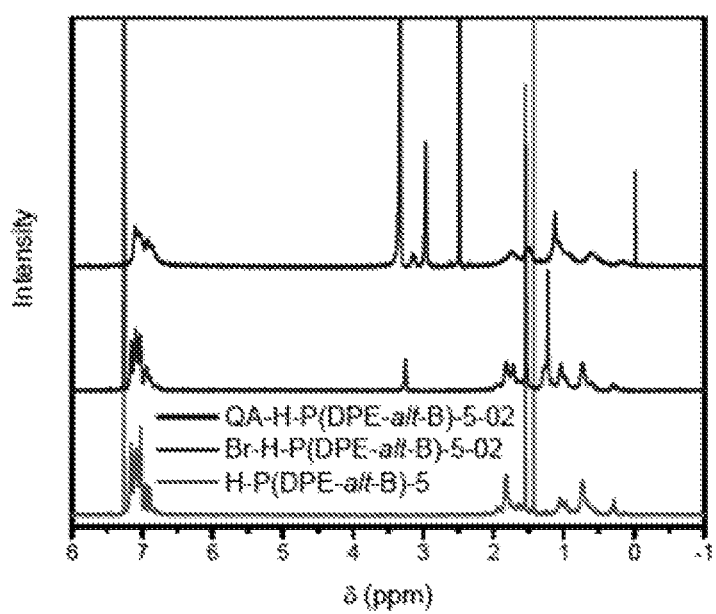

Br-H-P(DPE-alt-B) (0.4 g) was dissolved in THF (4.5 mL). An excess of trimethylamine solution in ethanol (4.2M, 33 wt %, 4.2 mL) was added. The reaction was stirred for 14 hours, then dimethyl sulfoxide (DMSO) (4.2 mL) was added. The reaction continued for another 10 hours, for a total of 24 hours. The reaction was either precipitated in hexane or cast directly into a film as QA-H-P(DPE-alt-B) as shown in FIG. 12, consistent with some embodiments of the present disclosure. To further characterize the polymer, the ion exchange capacity was determined via NMR integration and Mohr titration. Referring now to FIGS. 13A-13B, $^1$H NMR spectrums for two QA-H-P(DPE-alt-B) samples were determined. Ion exchange capacities for the QA-H-P(DPE-alt-B) samples were also determined and are reported below at Tables 1 and 2.

TABLE 1

Ion Exchange Capacity (IEC) of QA-H-P(DPE-alt-B)-5-01

| Polymer | Theoretical IEC (meq/g) | NMR IEC (meq/g) | Titration IEC (meq/g) |
|---|---|---|---|
| QA-H-P(DPE-alt-B)-5-01 | 2.51 | 2.54 | 2.64 (±0.07) |

TABLE 2

Ion Exchange Capacity (IEC) of QA-H-P(DPE-alt-B)-5-02

| Polymer | Theoretical IEC (meq/g) | NMR IEC (meq/g) | Titration IEC (meq/g) |
|---|---|---|---|
| QA-H-P(DPE-alt-B)-5-02 | 1.43 | 1.54 | 1.34 (±0.08) |

Methods and systems of the present disclosure are advantageous in that they exhibit enhanced chemical stability and ion conductivity when compared with traditional styrene-based alkaline anion exchange membranes. Without wishing to be bound by theory, the diphenylethylene-based alkaline anion exchange membranes lack the α-hydrogens sharing tertiary carbons with phenyl groups from polystyrene or styrene-based precursor polymers. The α-hydrogens are protic, and thus the tertiary carbons are chemically susceptible in alkaline conditions by protonation of the α-hydrogens. The polymer structure of the present disclosure, where the α-hydrogens sharing tertiary carbons with phenyl groups do not exist, thus exhibit higher chemical stability.

Also, the tertiary carbons of the main polymeric backbone chains of the diphenylethylene-based polymers are apart from each other by about 3 to 6 carbons, and consequently the ionic groups attached at the diphenyl groups are also apart from each other by these carbon spacing groups. This carbon-spacing molecular structure of diphenylethylene-butadiene/isoprene copolymers substantially evenly distributes the ionic groups along the chains, and the ion conductivity and chemical stability are enhanced. The alkaline anion exchange membranes according to some embodiments of the present disclosure are advantageous for use in fuel cells, electrolyzers employing hydrogen, ion separations, etc.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. An ion exchange membrane material comprising:
a polymer according to Formula I:

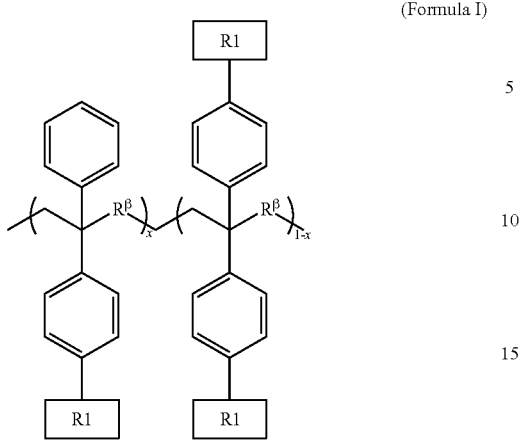

(Formula I)

wherein each $R^\beta$ includes an alkadiene, a hydrogenated alkadiene, or combinations thereof; and each R1 includes an alkylated substrate including a hydrocarbyl group and at least one ionic group.

2. The ion exchange membrane material according to claim 1, wherein each $R^\beta$ includes a hydrocarbyl backbone chain having about 3 to about 6 carbons.

3. The ion exchange membrane material according to claim 1, wherein the ionic groups include one or more ammonium groups, one or more multication hydrocarbyl chains, or combinations thereof.

\* \* \* \* \*